United States Patent [19]
Leavitt et al.

[11] 3,762,619
[45] Oct. 2, 1973

[54] APPARATUS FOR HOLDING TWO FILMS IN INTIMATE CONTACT WITH EACH OTHER

[75] Inventors: Minard A. Leavitt, Sepulveda; Poul B. Roulund, El Toro, both of Calif.

[73] Assignee: Cutler-Hammer, Inc., Milwaukee, Wis.

[22] Filed: Mar. 23, 1972

[21] Appl. No.: 237,580

Related U.S. Application Data

[60] Division of Ser. No. 46,430, June 15, 1970, Pat. No. 3,667,845, which is a continuation-in-part of Ser. No. 27,690, April 13, 1970, abandoned.

[52] U.S. Cl.................. 226/109, 226/97, 156/497
[51] Int. Cl............................................. B65h 17/32
[58] Field of Search................ 226/97, 109; 355/91; 156/285, 497

[56] References Cited
UNITED STATES PATENTS 3,606,536    9/1969   Beispel.................................. 355/91
3,644,040    2/1972   Beispel.............................. 355/91 X
3,468,606    9/1969   Wolf et al. ...................... 226/97 UX Primary Examiner—Allen N. Knowles
Assistant Examiner—Gene A. Church
Attorney—Christie, Parker & Hale

[57] ABSTRACT

A contact printer has two closely spaced adjacent platens with dissimilar patterns of fluid passages. Fluid is forced through the passages to form between the platens and the adjacent film surfaces fluid cushions that hold the films in intimate contact with each other. The passages are sufficiently concentrated and so arranged to support the films between the platens without appreciable lateral movement. In the preferred embodiment, the platens are slabs of microporous material. In another embodiment, the platens are slabs of nonporous material having discrete holes.

4 Claims, 4 Drawing Figures

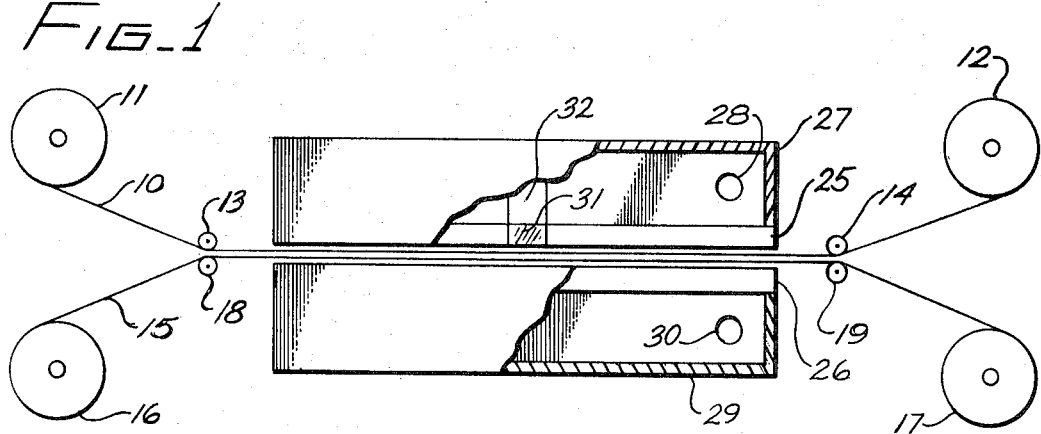
Fig_1
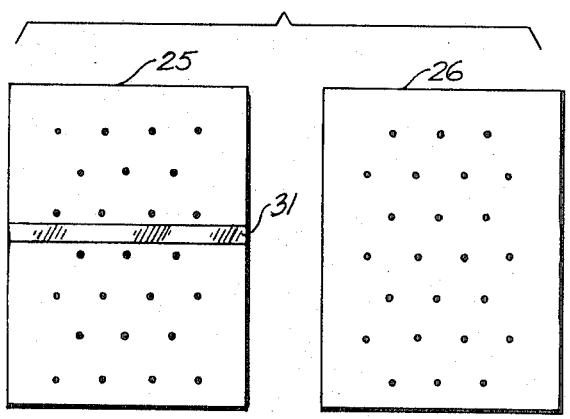
Fig_2
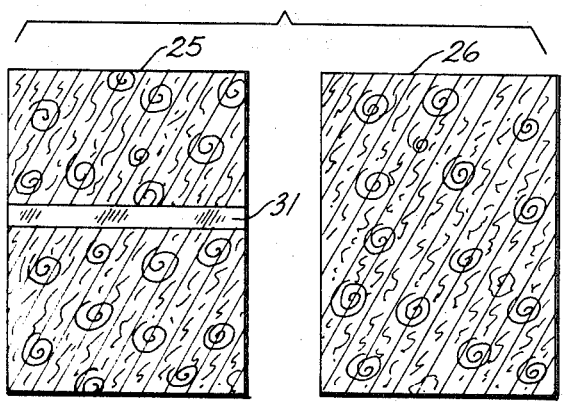
Fig_3
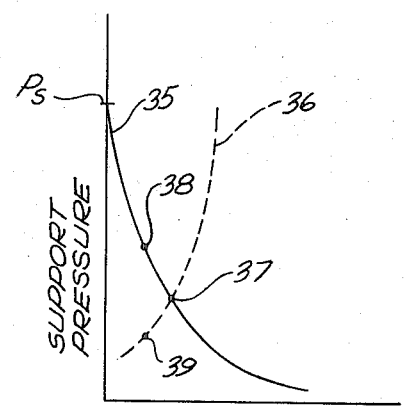
Fig_4

APPARATUS FOR HOLDING TWO FILMS IN INTIMATE CONTACT WITH EACH OTHER

CROSS REFERENCE TO RELATED APPLICATIONS

This application is a division of application Ser. No. 46,430, filed June 15, 1970, now U.S. Pat. No. 3,667,845, which in turn is a continuation-in-part of a copending application, Ser. No. 27,690, filed on Apr. 13, 1970 now abandoned.

BACKGROUND OF THE INVENTION

This invention relates to the film handling art and, more particularly, to apparatus for holding two lengths of film in intimate contact with each other.

The need sometimes arises to bring two ribbon-type media into intimate contact with each other for the purpose of transferring information from one medium to the other. For example, a contact printer transfers a photographic image from a master film to a raw film by exposing the films to light while they are in contact. Contact printing is particularly advantageous for microfilm reproduction on a mass scale because the image can be transferred without a size reduction or the distortion that might be introduced by a lens system.

Film wear can be minimized by bringing two films into contact with air pressure. However, it is difficult to control the paths of films supported by air pressure. If unequal forces are exerted on opposite sides of the films, they tend to move laterally, i.e. to flutter. This is highly undesirable because it may degrade the image produced on the raw film and may increase film wear. N. R. Timares et al U.S. Pat. No. 3,161,120, which issued Dec. 15, 1964, discloses apparatus comprising two adjacent spaced air platens between which two films pass. This patent teaches that the platens should have identical patterns of pin holes through which air is forced to form air cushions that hold the films together without appreciable lateral film movement.

SUMMARY OF THE INVENTION

Contrary to the teachings of the above-referenced Timares et al patent, the invention specifies a pair of closely spaced adjacent platens having dissimilar patterns of fluid passages. It has been found that two films can be supported in intimate contact with each other by fluid cushions in this way without appreciable lateral film movement if the dissimilar patterns of fluid passages are sufficiently concentrated and strategically arranged. Thus, the invention is particularly well suited for use in a contact film printer.

Preferably, the platens are slabs of microporous material having a high impedance to fluid flow. When fluid is forced through the microporous platens it forms fluid cushions that essentially support the films by a uniform static head of fluid. The support pressure between each platen and the adjacent film surface produced by such a fluid cushion is inversely and non-linearly related to the spacing between the platen and the adjacent film surface. Accordingly, precise control over the film path can be maintained because an extremely large restoring force is exerted on the film when it deviates from its prescribed path. This means that the films pass through the space between the platens without appreciable lateral movement.

Alternatively, the platens could be slabs of nonporous material having discrete, artificial holes which serve as the fluid passages. The holes are sufficiently concentrated and so arranged to support the films without appreciable lateral movement. Particularly, the holes are so arranged as to balance the various force couples that are exerted on opposite sides of the film by the individual holes. In this arrangement, the films may be supported by the velocity head of the fluid; by the static head as previously described; or by a combination of forces depending upon the parameters selected.

BRIEF DESCRIPTION OF THE DRAWING

The features of specific embodiments of the best mode contemplated of carrying out the invention are illustrated in the drawing, in which:

FIG. 1 is a schematic diagram of a contact film printer;

FIG. 2 is a diagram of one embodiment of the platens of FIG. 1 placed side by side in the same plane;

FIG. 3 is another embodiment of the platens of FIG. 1 placed side by side in the same plane; and FIG. 4 is a graph that illustrates the characteristics of the support pressure of the fluid cushions formed by the platens of FIG. 3.

DETAILED DESCRIPTION OF THE SPECIFIC EMBODIMENTS

In FIG. 1 a length of master film 10 bearing graphic information to be reproduced is guided from a supply reel 11 to a takeup reel 12 by spaced guide rollers 13 and 14. A length of raw film 15, on which the graphic information is to be reproduced, is directed from a supply reel 16 to a takeup reel 17 by spaced guide rollers 18 and 19. Film 15 bears a photographic emulsion. Reels 11, 12, 16, and 17 are rotatably supported to permit the transfer of film from one reel to the other, and guide roller 19 is driven by a motor (not shown) to transport raw film 15. Alternatively, other more sophisticated film transporting and guiding equipment could be provided.

In the portion of the film path between guide rollers 13 and 18 and guide rollers 14 and 19, master film 10 and raw film 15 are adjacent to and in alignment with each other. Adjacent, closely spaced platens 25 and 26 are disposed so films 10 and 15 are adjacent to and in alignment with each other. Adjacent, closely spaced platens 25 and 26 are disposed so films 10 and 15 pass between them in the adjacent portion of the film path. Platens 25 and 26 have transverse, i.e., vertical, as viewed in FIG. 1, fluid passages through them. A plenum chamber 27, which is supplied air at a high pressure through a port 28 overlies platen 25. A plenum chamber 29, which is supplied air under pressure through a port 30, underlies platen 26. The air from plenum chambers 27 and 29 is forced through the transverse passages of platens 25 and 26, respectively, to form between each of them and the adjacent film surface a supporting cushion of air. The passages through platen 25 form a pattern that is dissimilar from the pattern of passages through platen 26. These passages are sufficiently concentrated and so arranged that films 10 and 15 do not move appreciably in a lateral direction, i.e., vertically, as viewed in FIG. 1, as they pass between platens 25 and 26. A transparent section 31 is formed in platen 25 at a point immediate to its ends. A light source 32 is disposed in plenum chamber 27 directly over transparent section 31 to expose films 10 and 15 to light. If desired, transparent section 31 could be a trough-shaped housing to which air at a high static head is applied in the manner described in the parent application, Ser. No. 27,690. In this way, a downward force is exerted on film 10 continuously as it passes under section 31.

Films 10 and 15 are held in intimate contact with each other by the air cushions as one of the films, i.e., film 15, is positively driven. Accordingly, the other film, i.e., film 10, is driven along in intimate contact with it, and raw film 15 is exposed to the image on master film 10. Films 10 and 15 are shown as spaced in FIG. 1 to distinguish them from each other.

FIG. 2 depicts one embodiment of platens 25 and 26 laid side by side in the same plane. In this embodiment, platens 25 and 26 comprise slabs of nonporous material, such as metal, with small, artificial, discrete holes through them. These holes could be formed by drilling. As illustrated in FIG. 2, the holes of platens 25 and 26 form dissimilar patterns. In this embodiment, the films are held in intimate contact predominantly by the velocity head of the air. It has been found that two films can be held in intimate contact with each other without appreciable lateral movement by platens having dissimilar patterns of holes, if the holes are sufficiently concentrated and strategically arranged. The air from one hole in each platen can be considered as exerting a force couple on the two films with the air from a hole in the other platen. The holes considered in their entirety are so arranged that all these force couples balance each other.

FIG. 3 depicts the preferred embodiment of platens 25 and 26 placed side by side in the same plane. In this embodiment, platens 25 and 26 are slabs of microporous material, the passages comprising the tiny interconnected cells formed in the material. The microporous material could be sintered metal such as oilite with the oil removed, or a cast material with open or interconnected cells. A microporous material is characterized by its high impedance to the passage of fluid through it. As a result, the films are predominantly supported by the static pressure head of the air. Since the cells or pores of a microporous material are substantially random in distribution and of maximum concentration, the criteria set out above in connection with FIG. 2 for dissimilar patterns of air passages are inherently met by a microporous material.

In the graph of FIG. 4, a curve 35 represents the support pressure exerted against film 15 by the air passing through microporous platen 26 of FIG. 3 as a function of distance from the surface of platen 26. When the film 15 is flush against platen 26, the support pressure is the pressure $P_s$, of the air in plenum chamber 29. As the distance, i.e., spacing increases, the support pressure drops off sharply. A curve 36 represents the support pressure exerted against film 10 by the air passing through microporous platen 25 in FIG. 3. In this case, the spacing between film 10 and the surface of platen 25 increases from right to left on the graph. Assuming that the two films are being supported in a vertical position rather than in a horizontal position, as shown in FIG. 1, so one film does not support the weight of the other film, and assuming that there are no external forces imposed upon the films, the two films are spaced from the surfaces of platens 25 and 26 such that equal support pressure is exerted on their opposite surfaces as depicted at a point 37. When the films are in a horizontal position, as actually depicted in FIG. 1, the support pressure exerted on film 15 by platen 26, represented at point 38, is larger than the support pressure exerted on film 10 by platen 25, represented by a point 39, by the weight per square inch of the films. In either film orientation, it can be seen from the graph of FIG. 4 that if an external force is applied to one of the film surfaces to move the films away from their equilibrium position, the pressure exerted on the surface of one film increases sharply and the pressure exerted on the surface of the other film simultaneously decreases sharply, thereby producing an extremely large force that restores the films to their equilibrium position. The dimension of the spacing illustrated in FIG. 4 is very small in comparison to the dimensions of any practical film surface being supported. This relationship combines with the viscosity of the support fluid to produce a velocity dependent force which provides high damping to suppress undesirable oscillations or flutter of the supported films. In summary, the characteristics of the air cushion support pressure promote the establishment of a highly stable and controlled film path between platens 25 and 26. A typical spacing between the surface of each platen and the adjacent film surface is 1.5 mils. A typical pressure in the plenum chamber is 15 psi with ¼ inch thick oilite platen.

The described embodiments of the invention are considered to be preferred and illustrative of the inventive concept; the scope of the invention is not to be restricted to such embodiments. Various and numerous other arrangements may be devised by one skilled in the art without departing from the spirit and scope of this invention. The term "film" is used in this specification in its general sense to refer to flexible ribbon-type media in general, such as photographic film, magnetic tape, paper tape, etc. The invention could also be used to hold two lengths of magnetic tape in intimate contact to transfer magnetically recorded information from one tape to the other.

What is claimed is:

1. A ribbon transport system comprising:
   a first length of ribbon;
   a second length of ribbon;
   means for guiding the first length of ribbon in a first path;
   means for guiding the second length of ribbon in a second path part of which is adjacent to part of the first path;
   first and second adjacent closely spaced platens disposed so the adjacent portions of the lengths of ribbon lie in the space between the platens, the platens having through them dissimilar patterns of fluid passages; and
   means for forcing a fluid through the passages to form between the platens and the adjacent surfaces of the lengths of ribbon fluid cushions that hold the lengths of ribbon in intimate contact with each other between the platens.

2. The system of claim 1, in which the platens comprise sheets of microporous material.

3. The system of claim 1, in which the platens comprise sheets of nonporous material having as the fluid passages discrete holes through them of the same size, the holes through the platens being sufficiently concentrated and so arranged to support the lengths of ribbon without appreciable lateral movement.

4. The system of claim 3, in which the holes are arranged so as to balance the various couples that are exerted on the surfaces of the lengths of ribbon by the fluid from the individual holes.

* * * * *